(12) United States Patent
Friedman et al.

(10) Patent No.: US 8,903,763 B2
(45) Date of Patent: Dec. 2, 2014

(54) METHOD, SYSTEM, AND PROGRAM PRODUCT FOR TRANSFERRING DOCUMENT ATTRIBUTES

(75) Inventors: Nancy L. Friedman, Apex, NC (US); Phong V. Ly, Tolland, CT (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 11/358,331

(22) Filed: Feb. 21, 2006

(65) Prior Publication Data

US 2007/0198555 A1 Aug. 23, 2007

(51) Int. Cl.
*G06F 17/30* (2006.01)

(52) U.S. Cl.
CPC ............................... *G06F 17/30011* (2013.01)
USPC ............................ 707/609; 707/661; 707/673

(58) Field of Classification Search
CPC .......... G06F 11/1435; G06F 17/30082; G06F 17/30094; G06F 17/30598; G06F 3/0649
See application file for complete search history.

(56) References Cited

U.S. PATENT DOCUMENTS

| | | | |
|---|---|---|---|
| 5,832,208 A | 11/1998 | Chen et al. | |
| 6,021,510 A | 2/2000 | Nachenberg | |
| 6,047,285 A * | 4/2000 | Jacobs et al. | 707/4 |
| 6,094,731 A | 7/2000 | Waldin et al. | |
| 6,105,025 A * | 8/2000 | Jacobs et al. | 707/8 |
| 6,119,231 A | 9/2000 | Foss et al. | |
| 6,141,662 A * | 10/2000 | Jeyachandran | 1/1 |
| 6,453,325 B1 * | 9/2002 | Cabrera et al. | 707/204 |
| 6,513,034 B1 * | 1/2003 | Leung et al. | 707/3 |
| 6,577,920 B1 | 6/2003 | Hypponen et al. | |
| 6,609,123 B1 * | 8/2003 | Cazemier et al. | 707/4 |
| 6,629,097 B1 * | 9/2003 | Keith | 1/1 |
| 6,732,149 B1 | 5/2004 | Kephart | |
| 6,745,192 B1 | 6/2004 | Libenzi | |
| 6,851,057 B1 | 2/2005 | Nachenberg | |
| 6,985,901 B1 * | 1/2006 | Sachse et al. | 1/1 |
| 6,993,660 B1 | 1/2006 | Libenzi et al. | |
| 7,003,560 B1 * | 2/2006 | Mullen et al. | 709/223 |
| 7,330,853 B2 * | 2/2008 | Wayt et al. | 707/102 |
| 7,334,094 B2 * | 2/2008 | Fair | 711/161 |
| 7,346,844 B1 * | 3/2008 | Baer et al. | 434/362 |
| 7,464,238 B1 * | 12/2008 | Yadav | 711/162 |
| 2002/0002468 A1 * | 1/2002 | Spagna et al. | 705/1 |
| 2002/0016826 A1 | 2/2002 | Johansson et al. | |
| 2002/0053020 A1 * | 5/2002 | Teijido et al. | 713/153 |
| 2002/0103811 A1 * | 8/2002 | Fankhauser et al. | 707/104.1 |
| 2003/0227392 A1 * | 12/2003 | Ebert et al. | 340/825.49 |
| 2004/0117358 A1 * | 6/2004 | von Kaenel et al. | 707/3 |
| 2004/0193565 A1 * | 9/2004 | Feng et al. | 707/1 |
| 2004/0201604 A1 * | 10/2004 | Kraenzel et al. | 345/700 |
| 2004/0236884 A1 | 11/2004 | Beetz | |
| 2005/0065945 A1 * | 3/2005 | Heusermann | 707/100 |

(Continued)

*Primary Examiner* — Angelica Ruiz (74) *Attorney, Agent, or Firm* — Lisa Ulrich; Hoffman Warnick LLC (57) ABSTRACT

The present invention provides a method, system, and program product for transferring document attributes. Specifically, under the present invention, a change to an attribute corresponding to a document archived in a content storage system is received on an indexing system. In response to the change, an archival date corresponding to storage of the document in the content storage system is set to a current date. Also, a start date and an end date in an index transfer tool is set to the current date. Thereafter, the changed attribute is transferred to the content storage system based on a matching of the newly changed archival date with the set start and end dates.

21 Claims, 5 Drawing Sheets

(56) References Cited

U.S. PATENT DOCUMENTS

| | | | |
|---|---|---|---|
| 2005/0086231 A1* | 4/2005 | Moore | 707/100 |
| 2005/0097513 A1* | 5/2005 | Pepper et al. | 717/114 |
| 2005/0131907 A1* | 6/2005 | Matsuzawa et al. | 707/10 |
| 2005/0240636 A1* | 10/2005 | Shitomi et al. | 707/204 |
| 2005/0278302 A1* | 12/2005 | Ritter | 707/3 |
| 2006/0059253 A1* | 3/2006 | Goodman et al. | 709/223 |
| 2006/0129745 A1* | 6/2006 | Thiel et al. | 711/100 |
| 2006/0179087 A1* | 8/2006 | Fujii et al. | 707/205 |
| 2007/0038618 A1* | 2/2007 | Kosciusko et al. | 707/4 |
| 2007/0094312 A1* | 4/2007 | Sim-Tang | 707/204 |
| 2007/0118651 A1* | 5/2007 | Giampaolo et al. | 709/225 |
| 2007/0192442 A1* | 8/2007 | Bushee et al. | 709/219 |

* cited by examiner

FIG. 5

METHOD, SYSTEM, AND PROGRAM PRODUCT FOR TRANSFERRING DOCUMENT ATTRIBUTES

FIELD OF THE INVENTION

In general, the present invention relates to (electronic) document attribute transfer and storage. Specifically, the present invention relates to a method, system, and program product for transferring document attributes.

BACKGROUND OF THE INVENTION

With the continued development of Information Technology (IT) and integrated environments, electronic document archiving continues to grow in popularity. In one implementation, an organization can maintain its own content storage system, while using a third party system (e.g., an indexing system) to create an index that is stored in the indexing system (e.g., SAP) and later access documents. In this implementation, documents will be stored/archived in the content storage system from the indexing system using a document and index transfer tool/application that integrates the indexing system with the content storage system. One example of such a tool is Commonstore, which is commercially available from International Business Machines Corp. (IBM) of Armonk, N.Y.

In general, when a document is desired to be archived, it will be "attached" using the document and index transfer tool (i.e., because you can use an indexing system such as SAP to store documents into a content storage system without having to transfer any index information). The transferring of index information is generally necessitated by the need to be able to access the document outside the indexing system.

In any event, each document to be archived is typically assigned a unique identifier (e.g., a UID such as a hexadecimal string) in the indexing system prior to being archived in the content storage system. This allows the document to be later referenced/accessed from the indexing system using the UID. In addition, various document "attributes" can be specified. For example, if the document is a contract for services, possible attributes can include a contract number, a contract amount, a contact person, etc. These attributes will be transferred to the content storage system along with the actual document for the reasons described above.

This allows a layperson to access a document using its attributes instead of having to recall the document's unique identifier both inside and outside of the indexing system. In any event, when a document and its corresponding attributes are archived, an archival date (i.e., the date on which it was archived) is saved.

On occasion, document attributes may change. For example, a document's contact person may be changed. Such changes can be input into the indexing system using the index transfer tool, and then transferred to the content storage system so that the archived document's attributes can be changed accordingly. Unfortunately, current approaches result in the transfer of an overly-voluminous amount of information. Specifically, the transfer of attributes from the indexing system to the content storage system is currently based on the original archival date for the corresponding document. For example, if a document and its attributes are archived on Jan. 1, 1970, an archival date of Jan. 1, 1970 will be assigned. If the attributes for that document are changed on Jan. 1, 2006, those changes must be propagated to the content storage system. However, the existing system bases the transfer of changes on the original archival date. Therefore, all attributes for all documents that were archived between Jan. 1, 1970 and Jan. 1, 2006 will be transferred. Such an approach is inefficient and can waste valuable bandwidth.

In view of the foregoing, there exists a need for an approach that solves at least one of the deficiencies in the existing art.

SUMMARY OF THE INVENTION

In general, the present invention provides a method, system, and program product for transferring document attributes. Specifically, under the present invention, a change to an attribute corresponding to a document archived in a content storage system is received on an indexing system. In response to the change, an archival date corresponding to storage of the document in the content storage system is set to a current date. Also, a start date and an end date in an index transfer tool is set to the current date. Thereafter, the changed attribute is transferred to the content storage system based on a matching of the newly changed archival date with the set start and end dates. The present invention also allows the original archival date to be stored for future reference. Still yet, the present invention will transfer any new attributes corresponding to newly added documents along with the changed attributes (e.g., in a batch mode). As will be further described below, the present invention can be implemented using any content storage system and any indexing system. Examples of an indexing system include SAP, or any Enterprise Resource Planning (ERP) system such as those available from Peoplesoft®, Oracle®, etc.).

A first aspect of the present invention provides a method for transferring document attributes, comprising: receiving, on an indexing system, a change to an attribute corresponding to a document archived in a content storage system; setting an archival date corresponding to storage of the document in the content storage system to a current date in response to the change; setting a start date and an end date in an index transfer tool to the current date; and transferring the changed attribute to the content storage system based on the current date.

A second aspect of the present invention provides a system for transferring document attributes, comprising: a system for receiving, on an indexing system, a change to an attribute corresponding to a document archived in a content storage system; a system for setting an archival date corresponding to storage of the document in the content storage system to a current date in response to the change; a system for setting a start date and an end date in an index transfer tool to the current date; and a system for transferring the changed attribute to the content storage system based on the current date.

A third aspect of the present invention provides a program product stored on a computer readable medium for transferring document attributes, the computer readable medium comprising program code for causing a computer system to perform the following steps: receiving, on an indexing system, a change to an attribute corresponding to a document archived in a content storage system; setting an archival date corresponding to storage of the document in the content storage system to a current date in response to the change; setting a start date and an end date in an index transfer tool to the current date; and transferring the changed attribute to the content storage system based on the current date.

A fourth aspect of the present invention provides a method for deploying an application for transferring document attributes, comprising: providing a computer infrastructure being operable to: receive, on an indexing system, a change to an attribute corresponding to a document archived in a content storage system; set an archival date corresponding to storage of the document in the content storage system to a current date in response to the change; set a start date and an end date in an index transfer tool to the current date; and transfer the changed attribute to the content storage system based on the current date.

A fifth aspect of the present invention provides computer software embodied in a propagated signal for transferring document attributes, the propagated signal comprising instructions for causing a computer system to perform the following steps: receiving, on an indexing system, a change to an attribute corresponding to a document archived in a content storage system; setting an archival date corresponding to storage of the document in the content storage system to a current date in response to the change; setting a start date and an end date in an index transfer tool to the current date; and transferring the changed attribute to the content storage system based on the current date.

A sixth aspect of the present invention provides a business method for transferring document attributes.

Therefore, the present invention provides a method, system, and program product for transferring document attributes.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides a method, system, and program product for transferring document attributes. Specifically, under the present invention, a change to an attribute corresponding to a document archived in a content storage system is received on an indexing system. In response to the change, an archival date corresponding to storage of the document in the content storage system is set to a current date. Also, a start date and an end date in an index transfer tool is set to the current date. Thereafter, the changed attribute is transferred to the content storage system based on a matching of the newly changed archival date with the set start and end dates. The present invention also allows the original archival date to be stored for future reference. Still yet, the present invention will transfer any new attributes corresponding to newly added documents along with the changed attributes (e.g., in a batch mode). As will be further described below, the present invention can be implemented using any content storage system and any indexing system. Examples of an indexing system include SAP, or any Enterprises Resource Planning (ERP) system such as those available from Peoplesoft®, Oracle®, etc.). An example of a content storage system can be IBM's content storage server.

Figure 1:
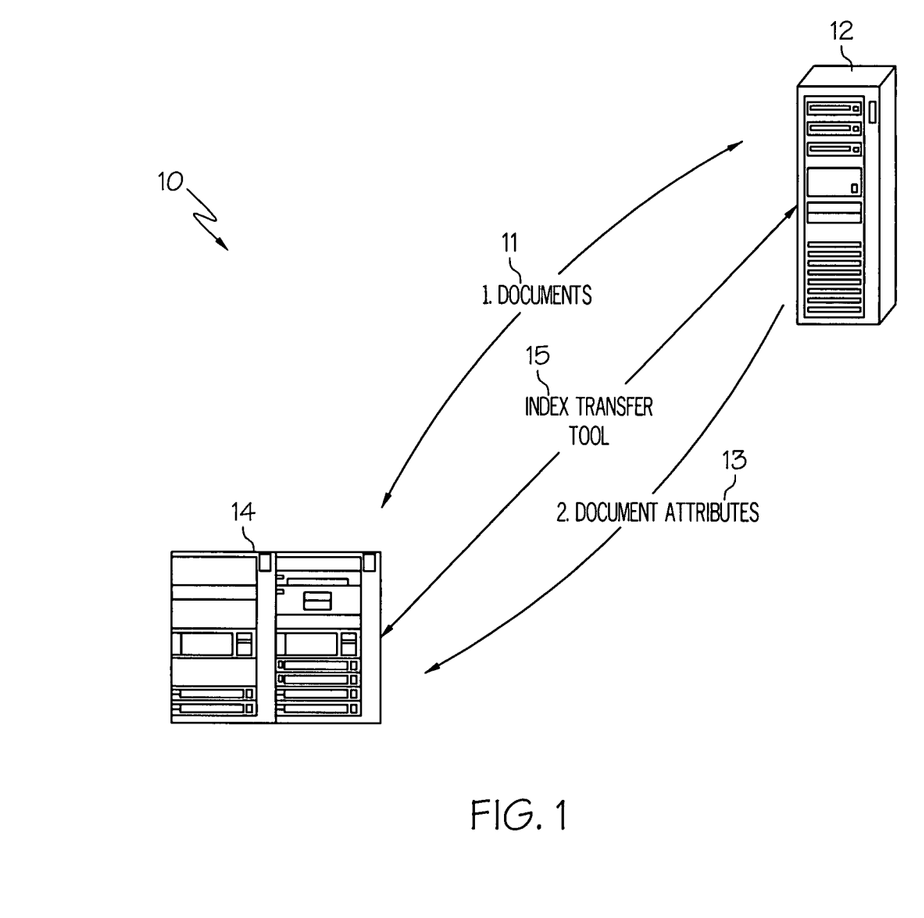
FIG. 1 depicts an architectural diagram according to the present invention.

Referring now to FIG. 1, an architectural diagram 10 depicting the relationship between an indexing system 12 and a content storage system 14 is shown. In general, (electronic) documents 11 can be archived in content storage system 14 through indexing system 12 using an index transfer tool 15. Specifically, using a program such as an index transfer tool 15, a user (not shown) can input document attributes 13 and "attach" documents 11 for archiving in content storage system 14. Document attributes 13 can include any type of data corresponding to documents 11. For example, attributes 13 could be a contact person, a reference number, etc. In any event, index transfer tool 15 will assign a unique identifier (UID) to each document 11, and then transfer documents 11, attributes 13, and the UIDs to content storage system 14 where they will be stored/archived. If a user later desires to access a particular document 11, he/she can do so from either indexing system 12 or content storage system 14 using the corresponding attributes 13 and/or the UID for the document 11.

As indicated above, attributes 13 for a document 11 may periodically change. When changes occur, they can be made on indexing system 12 and then transferred/propagated to content storage system 14. Unfortunately, previous approaches for transferring changes to attributes were based on the original archival date for the attributes/corresponding documents 11. Thus, if attribute "A" corresponding to document "X" was archived ten years ago, and attribute "A" was changed today, all attributes archived during the ten year window would be transferred along with the changed attribute "A." Such a requirement is highly inefficient and wasteful. As will be described and shown below, the present invention addresses these issues.

Figure 2:
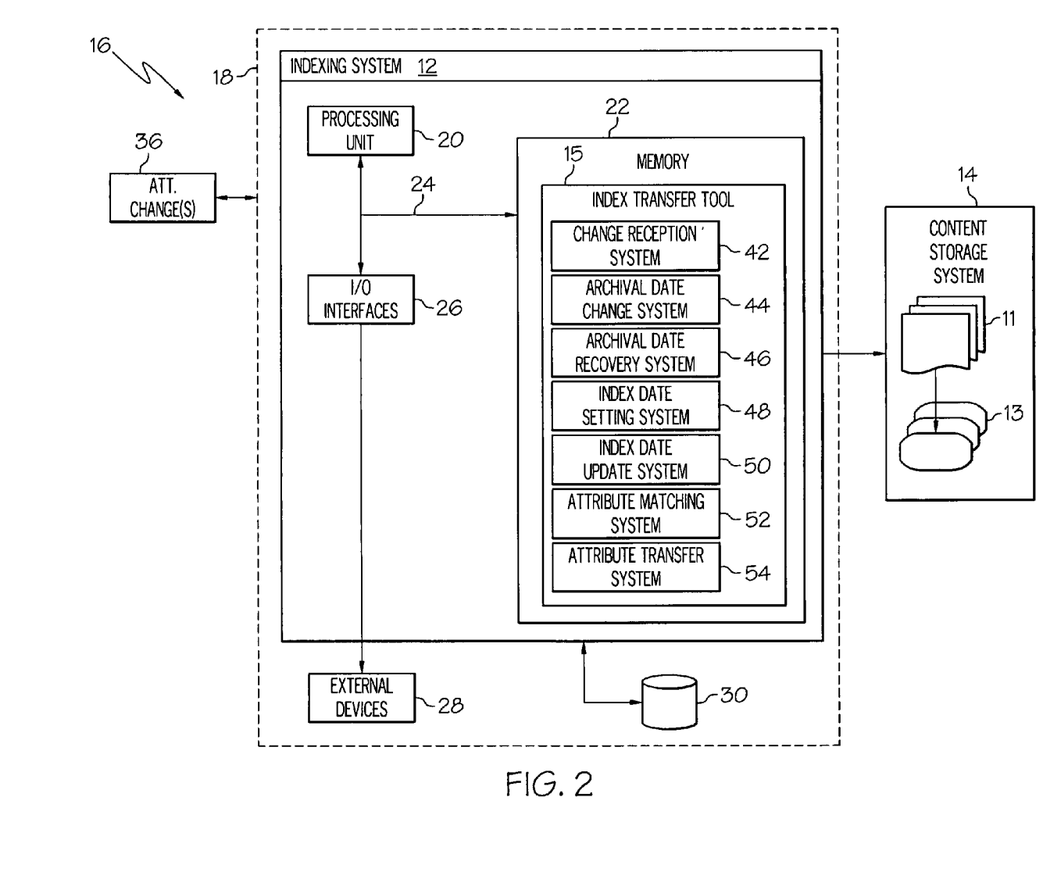
FIG. 2 depicts a more detailed view of the indexing system of FIG. 1 according to the present invention.

Referring now to FIG. 2, a more specific computerized implementation 16 of the present invention architecture 10 (FIG. 1) is shown. As depicted, implementation 16 shows indexing system 12 deployed within a computer infrastructure 18. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 18 is intended to demonstrate that some or all of the components of implementation 16 could be deployed, managed, serviced, etc. by a service provider. It should be understood that although not shown, content storage system 14 could be implemented within infrastructure 18 in addition to or in lieu of indexing system 12.

As shown, indexing system 12 includes a processing unit 20, a memory 22, a bus 24, and input/output (I/O) interfaces 26. Further, indexing system 12 is shown in communication with external I/O devices/resources 28 and storage system 30. In general, processing unit 20 executes computer program code, such as index transfer tool 15, which is stored in memory 22 and/or storage system 30. While executing computer program code, processing unit 20 can read and/or write data to/from memory 22, storage system 30, and/or I/O interfaces 26. Bus 24 provides a communication link between each of the components in indexing system 12. External devices 28 can comprise any devices (e.g., keyboard, pointing device, display, etc.) that enable a user to interact with indexing system 12 and/or any devices (e.g., network card, modem, etc.) that enable indexing system 12 to communicate with one or more other computing devices.

Computer infrastructure 18 is only illustrative of various types of computer infrastructures for implementing the invention. For example, in one embodiment, computer infrastructure 18 comprises two or more computing devices (e.g., a server cluster) that communicate over a network to perform the various process steps of the invention. Moreover, indexing system 12 is only representative of various possible computer systems that can include numerous combinations of hardware. To this extent, in other embodiments, indexing system 12 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 2 can be included in indexing system 12. However, if indexing system 12 comprises a handheld device or the like, it is understood that one or more external devices 28 (e.g., a display) and/or storage system(s) 30 could be contained within indexing system 12, not externally as shown.

Storage system 30 can be any type of system (e.g., a database) capable of providing storage for information under the present invention such as attributes, date settings, etc. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into indexing system 12.

Shown in memory 22 of indexing system 12 is index transfer tool 15, which includes change reception system 42, archival date change system 44, archival date recovery system 46, index date setting system 48, index date update system 50, attribute matching system 52, and attribute transfer system 54. It should be understood that index transfer tool 15 can further include part or all of any type of index transfer tool that is now known or later developed. For example, index transfer tool 15 can also include some or all of the components of IBM's Commonstore™ that are not shown in FIG. 2. In addition, although the systems shown in FIG. 2 are depicted within or being part of index transfer tool 15, this need not be the case. For example, some or all of the systems shown in FIG. 2 could be implemented as a: (1) separate tool or program that works in conjunction with index transfer tool 15; (2) as a plug-in to index transfer tool 15; etc.

Figure 3:
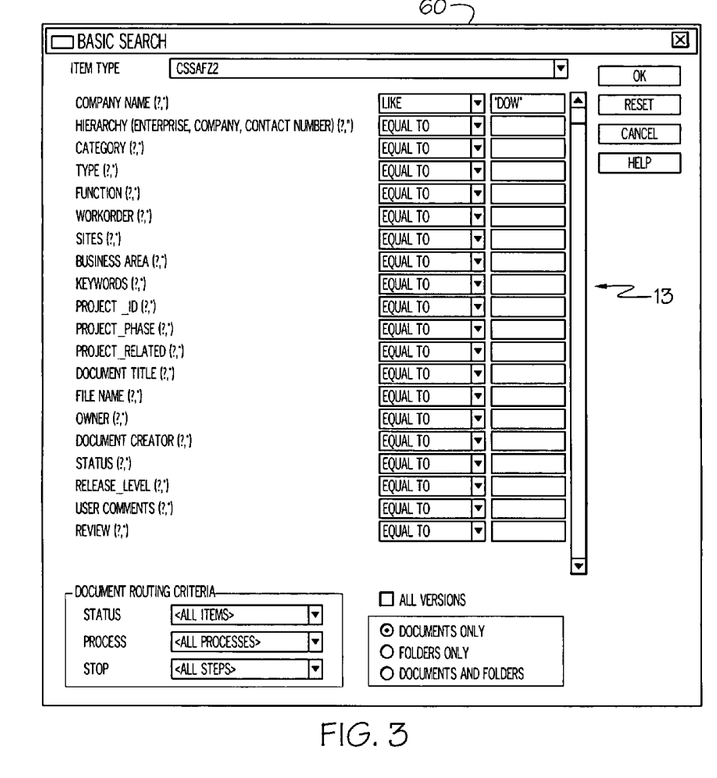
FIG. 3 depicts an illustrative view of attributes for a document according to the present invention.

In any event, assume in an illustrative example, that a set (at least one) of documents 11 having a set of corresponding attributes 13 were previously archived in content storage system 14 using index transfer tool 15. Referring to FIG. 3, a view 60 of illustrative attributes 13 is shown. As mentioned above, attributes 13 can comprise any type of information corresponding to a document 11 (FIG. 2). For example, attributes 13 can include a corresponding company, hierarchy, category, type, function, work order, etc. Referring back to FIG. 2, further assume that at least one change to at least one attribute 13 corresponding to a document 11 is needed. Under the present invention, such change(s) 36 will be received by change reception system 42. Upon receipt, archival date change system 44 will set/change the original archival date corresponding to the storage of the document 11 in content storage system 14 to a current date. For example, if the document 11 was stored on Jan. 1, 1970, and the current date is Jan. 1, 2006, archival date change system 44 will set/change the archival date of the document 11 from Jan. 1, 1970 to Jan. 1, 2006. Archival date recovery system 46 will save the original archival date of Jan. 1, 1970 for future reference.

Figure 4:
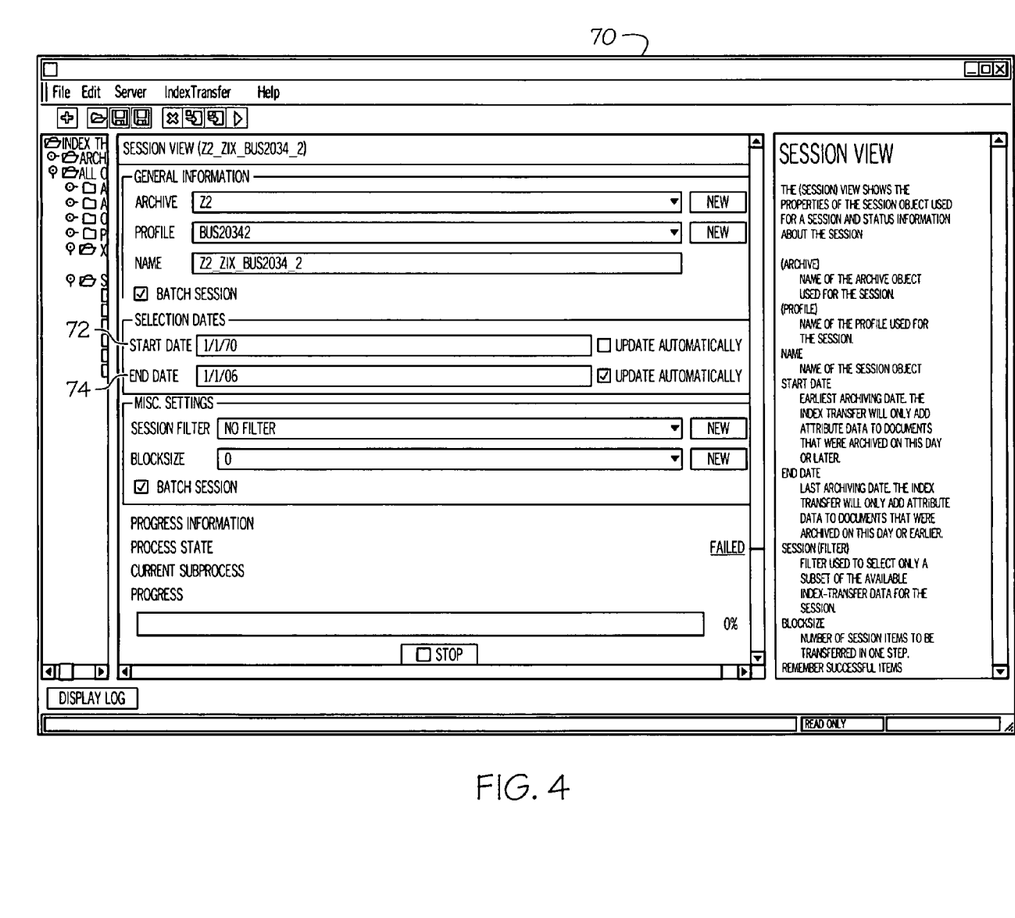
FIG. 4 depicts a first illustrative view of index transfer settings prior to being changed according to the present invention.

To facilitate the transfer of only "delta" and newly input attributes in accordance with the present invention, index date setting system 48 will set a start date and an end date in index transfer tool 15 to the current date (e.g., Jan. 1, 2006). Specifically, referring to FIG. 4, a first index transfer view 70 provided by index transfer tool 15 (FIG. 2) is shown. In addition to other pieces of information such as a corresponding archive and profile, view 70 allows a start date 72 and an end date 74 to be designated. These dates are used by index transfer tool 15 to transfer attributes 13 from indexing system 12 (FIG. 2) to content storage system 14 (FIG. 2). Specifically, as shown, prior to being set to the current date by index date setting system 48 in accordance with the present invention, start date 72 is set to the original archival date of the document 11 to which the attributes 13 correspond.

Figure 5:
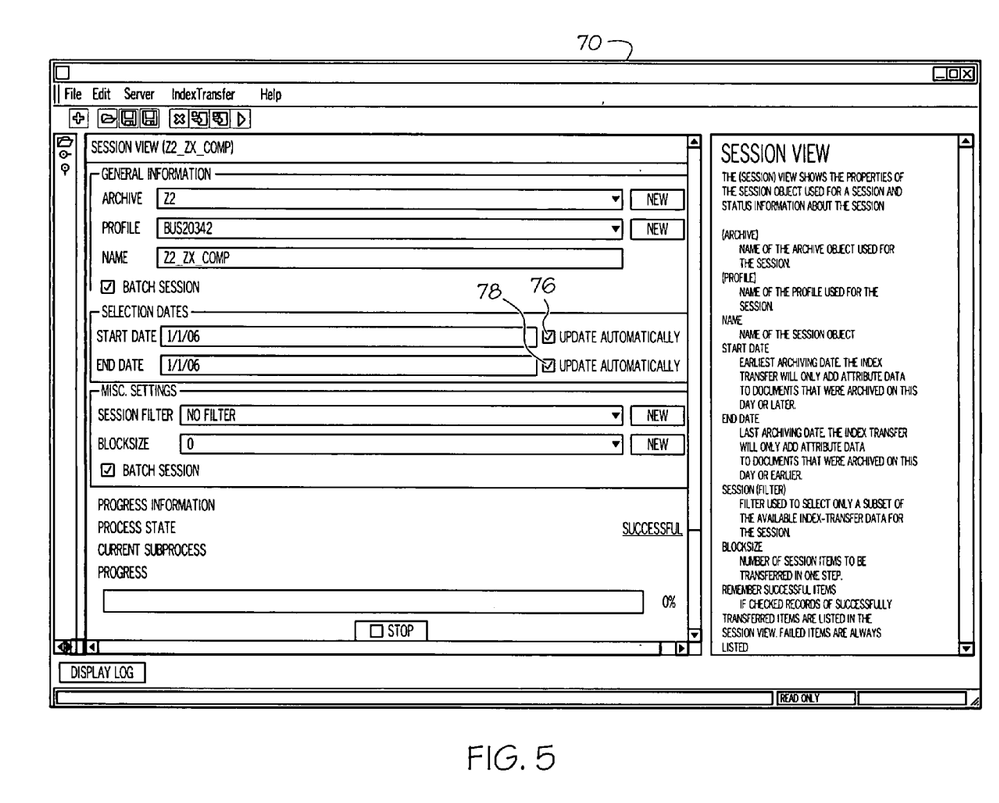
FIG. 5 depicts a second illustrative view of index transfer settings after being changed according to the present invention.

Referring to FIG. 5, view 70 is shown after start date 72 and end date 74 have been set by index date setting system 48 (FIG. 2). As can be seen, both start date 72 and end date 74 have been set to Jan. 1, 2006. As will be further explained below, this will cause only attributes changed and/or originally entered on Jan. 1, 2006 to be transferred to content storage system 14 (FIG. 2). As further shown in FIG. 5, automatic update features 76 and 78 for start date 72 and end date 74, respectively, have been activated. This will cause the dates 72 and 74 to be automatically updated to the current date is. This activation of automatic update features 76 and 78 is provided by finctionality is provided by index date update system 50.

Referring back to FIG. 2, once the dates are updated to the current date, attribute matching system 52 will determine which attributes should by transferred to content storage system 14. This determination will be based on the current date. Specifically, attribute matching system 52 will identify the attributes to be transferred by matching the archival date as changed to the current date with the newly set start and end dates. Any attribute 13 having a three-way match between the archival date, start date and end date is considered to be a newly changed (or newly input) attribute 13 and subject to transfer accordingly.

Based on the results of the matching process, attribute transfer system 54 will transfer the subject attributes 13 to content storage system 14 for storage. As indicated above, attributes 13 changed and/or newly added on the current date will be transferred and stored in the appropriate records (e.g., those for the corresponding documents 11) in content storage system 14.

The present invention is typically implemented using an index transfer tool 15. Shown below is illustrative code for an existing index transfer tool as modified in accordance with the present invention:

```
FORM update_attributes_and_tree using p_old_attributes structure
zix_documents.
    data answer.
    select single * from zix_documents where container_id =
    p_old_attributes-container_id.
    if sy-subrc = 0.
        CALL FUNCTION 'POPUP_TO_CONFIRM'
            EXPORTING
                TITLEBAR         = 'Change'(054)
                TEXT_QUESTION    = 'Change
                                    Attributes?'(053)
                TEXT_BUTTON_1    = 'Yes'
                TEXT_BUTTON_2    = 'No'
                DISPLAY_CANCEL_BUTTON = ''
            IMPORTING
                ANSWER           = answer
            EXCEPTIONS
                TEXT_NOT_FOUND   = 1
                OTHERS           = 2.
        IF SY-SUBRC <> 0.
*       MESSAGE ID SY-MSGID TYPE SY-MSGTY NUMBER SY-MSGNO
*           WITH SY-MSGV1 SY-MSGV2 SY-MSGV3 SY-MSGV4.
        ENDIF.
        if answer = '1'.
            CALL FUNCTION 'Z_IX_COMDOC_ATTRIBUTES'
                EXPORTING
                    MODE          = 'E'
                    P_OLD_ATTRIBUTES = p_old_attributes
                IMPORTING
                    ACTION        = answer
                TABLES
                    CONTRACTS     = itab_attcon
                CHANGING
                    DOC           = zix_documents.
            if answer = 'A'.
*       Update link table TOA01 for CM/CS
*       if attributes are changed.
                select single * from toa01 into wa_toa01 where
                    arc_doc_id eq zix_documents-docid and
                    sap_object eq
                    zix_documents-attachpoint and object_id eq
                    zix_documents-objectkey and
                    archiv_id eq 'Z2'.
                if sy-subrc ne 0.
                    clear wa_toa01.
                endif.
                perform update_attcon tables itab_attcon.
                move-corresponding zix_documents to wa_toa01.
                update zix_documents.
                wa_toa01-ar_date = sy-datum.
                update TOA01 from wa_toa01.
                if sy-subrc ne 0.
                    message e014(zix_doi_docstore).
                else.
                    perform refresh_tree.
                endif.
            endif.
        endif.
        if answer = '2' or answer = 'X'.
            CALL FUNCTION
            'Z_IV_WRITE_CHANGE_RECORD'
                EXPORTING
                    ATTRIBUTE_REC     = zix_documents
                    OLD ATTRIBUTE REC = p_old_attributes
                    CHANGE_DOC_MODE = 'U'.
        endif.
    endif.
ENDFORM.              '' update_attributes_and_tree
```

While shown and described herein as a method, system, and program product for transferring document attributes, it is understood that the invention further provides various alternative embodiments. For example, in one embodiment, the invention provides a computer-readable/useable medium that includes computer program code to enable a computer infrastructure to transfer document attributes. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 22 (FIG. 2) and/or storage system 30 (FIG. 2) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to transfer document attributes. In this case, the service provider can create, maintain, support, etc., a computer infrastructure, such as computer infrastructure 18 (FIG. 2) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for transferring document attributes. In this case, a computer infrastructure, such as computer infrastructure 18 (FIG. 2), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as indexing system 12 (FIG. 2), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method executed on a computer device for transferring document attributes, comprising:
   receiving, on an indexing system, a change to at least one attribute of a document stored in a content storage system, the document having a plurality of attributes, each attribute of the plurality of attributes describing a feature of the document, the document having an archival date that is initially set to a date that the document was originally stored in the content storage system;
   resetting the archival date of the document to a current date only in response to receiving the change to the at least on attribute;
   saving the date that the document was originally stored for future reference;
   setting a start date and an end date of the index transfer tool to the current date in response to receiving the change to the at least one attribute, wherein the index transfer tool integrates the indexing system with the content storage system;
   identifying the at least one attribute of the document that has been changed by using a three-way matching of the archival date, the start date, and the end date; and
   transferring only the identified changed attributes from the indexing system to the content storage system based on the three-way matching of the changed archival date with the start date and the end date of the index transfer tool.

2. The method of claim 1, wherein the indexing system comprises a Systems, Application and Products in Data Processing (SAP) system.

3. The method of claim 1, wherein the indexing system comprises an Enterprise Resource Planning (ERP) system.

4. The method of claim 1, further comprising transferring, with the changed attribute, a newly added attribute corresponding to a new document to be archived in the content storage system.

5. The method of claim 1, further comprising saving the archival date prior to the changing.

6. The method of claim 1, further comprising activating an automatic update feature for the start date and the end date in the index transfer tool.

7. The method of claim 1, further comprising archiving the document and the attribute in the content storage system from the indexing system using the index transfer tool, prior to receiving the change.

8. A system for transferring document attributes, comprising:
   a computer device including:
   a system for receiving, on an indexing system, a change to at least one attribute of a document stored in a content storage system, the document having a plurality of attributes, each attribute of the plurality of attributes describing a feature of the document, the document having an archival date that is initially set to a date that the document was originally stored in the content storage system;
   a system for resetting the archival date of the document to a current date only in response to receiving the change to the at least one attribute;
   a system for saving the date that the document was originally stored for future reference;
   a system for setting a start date and an end date of the index transfer tool to the current date in response to receiving the change to the at least one attribute, wherein the index transfer tool integrates the indexing system with the content storage system;
   a system for identifying the at least one attribute of the document that has been changed by using a three-way matching of the archival date, the start date, and the end date;
   and
   a system for transferring only the identified changed attributes from the indexing system to the content storage system based on the three-way matching of the changed archival date with the start date and the end date of the index transfer tool.

9. The system of claim 8, wherein the indexing system comprises a Systems, Application and Products in Data Processing (SAP) system.

10. The system of claim 8, wherein the indexing system comprises an Enterprise Resource Planning (ERP) system.

11. The system of claim 8, wherein the system for transferring further transfers, with the changed attribute, a newly added attribute corresponding to a new document to be archived in the content storage system.

12. The system of claim 8, further comprising a system for saving the archival date.

13. The system of claim 8, further comprising a system for activating an automatic update feature for the start date and the end date in the index transfer tool.

14. A computer program comprising program code embodied in at least one computer readable hardware storage medium, which when executed, enables a computer system to implement a method of transferring document attributes, the method comprising:
   receiving, on an indexing system, a change to at least one attribute of a document stored in a content storage system, the document having a plurality of attributes, each attribute of the plurality of attributes describing a feature of the document, the document having an archival date that is initially set to a date that the document was originally stored in the content storage system;
   resetting the archival date of the document to a current date only in response to receiving the change to the at least one attribute;
   saving the date that the document was originally stored for future reference;
   setting a start date and an end date of the index transfer tool to the current date in response to receiving the change to the at least one attribute, wherein the index transfer tool integrates the indexing system with the content storage system;
   identifying the at least one attribute of the document that has been changed by using a three-way matching of the archival date, the start date, and the end date; and
   transferring only the identified changed attributes from the indexing system to the content storage system based on the three-way matching of the changed archival date with the start date and the end date of the index transfer tool.

15. The computer program of claim 14, wherein the indexing system comprises a Systems, Application and Products in Data Processing (SAP) system.

16. The computer program of claim 14, wherein the indexing system comprises an Enterprise Resource Planning (ERP) system.

17. The computer program of claim 14, further comprising transferring, with the changed attribute, a newly added attribute corresponding to a new document to be archived in the content storage system.

18. The computer program of claim 14, further comprising saving the archival date prior to the changing.

19. The computer program of claim 14, further comprising activating an automatic update feature for the start date and the end date in the index transfer tool.

20. The computer program of claim 14, further comprising archiving the document and the attribute in the content storage system from the indexing system using the index transfer tool.

21. A method for deploying an application for transferring document attributes, comprising:
  providing a computer being operable to:
    receive, on an indexing system, a change to at least one attribute of a document stored in a content storage system, the document having a plurality of attributes, each attribute of the plurality of attributes describing a feature of the document, the document having an archival date that is initially set to a date that the document was originally stored in the content storage system;
    reset the archival date of the document to a current date only in response to receiving the change to the at least one attribute;
    saving the date that the document was originally stored for future reference;
    set a start date and an end date of the index transfer tool to the current date in response to receiving the change to the at least one attribute, wherein the index transfer tool integrates the indexing system with the content storage system;
    identify the at least one attribute of the document that has been changed by using a three-way matching of the archival date, the start date, and the end date; and
    transfer only the identified changed attributes from the indexing system to the content storage system based on the three-way matching of the changed archival date with the start date and the end date of the index transfer tool.

* * * * *